United States Patent
Barnes et al.

(10) Patent No.: US 8,437,960 B2
(45) Date of Patent: May 7, 2013

(54) GRAVITY SURVEY DATA PROCESSING

(75) Inventors: Gary Barnes, Cambridgeshire (GB); Mark Davies, Cambridgeshire (GB); John Morris Lumley, Cambridgeshire (GB); Phill Houghton, Cambridgeshire (GB)

(73) Assignee: ARKeX Limited, Cambridge (GB)

( * ) Notice: Subject to any disclaimer, the term of this patent is extended or adjusted under 35 U.S.C. 154(b) by 837 days.

(21) Appl. No.: 11/989,471
(22) PCT Filed: Jul. 17, 2006
(86) PCT No.: PCT/GB2006/050211
§ 371 (c)(1), (2), (4) Date: Mar. 4, 2009
(87) PCT Pub. No.: WO2007/012895
PCT Pub. Date: Feb. 1, 2007

(65) Prior Publication Data
US 2009/0216451 A1    Aug. 27, 2009

Related U.S. Application Data

(60) Provisional application No. 60/754,862, filed on Dec. 29, 2005.

(30) Foreign Application Priority Data

Jul. 27, 2005 (GB) .................................. 0515401.8
Jul. 27, 2005 (GB) .................................. 0515402.6

(51) Int. Cl.
*G01V 3/38* (2006.01)
(52) U.S. Cl.
USPC .......................................................... 702/5
(58) Field of Classification Search ............... 702/5, 16, 702/38, 57, 150–153, 189
See application file for complete search history.

(56) References Cited

U.S. PATENT DOCUMENTS 5,602,731 A    2/1997   Nordin et al.
5,673,191 A    9/1997   Chapin et al.
(Continued)

FOREIGN PATENT DOCUMENTS

CA    2 261 510 A1    8/2000
GB    2174210 A       10/1986
(Continued)

OTHER PUBLICATIONS

English translation of Russian Office Action for Application No. 2008107327/28, 2010.

*Primary Examiner* — Mohamed Charioui
(74) *Attorney, Agent, or Firm* — Foley & Lardner LLP

(57) ABSTRACT

This invention relates to improved techniques for processing potential field measurement data from airborne surveys such as gravity surveys, and to improved techniques for data acquisition which are enabled by the improved data processing techniques. We describe a method of processing measured potential field data from a potential field survey of the earth to determine map data for mapping said field, the method comprising: inputting said measured potential field data, said measured potential field data comprising data defining a plurality of potential field measurements and associated positions, each said position defining a position of a said potential field measurement in three dimensions; determining a plurality relationships between said potential field measurements and said positions, each said relationship relating a said potential field measurement to a function of a said associated position in three dimensions multiplied by a field mapping parameter; and determining a substantially self-consistent set of said field mapping parameters for said plurality of relationships to thereby determine said map data.

7 Claims, 4 Drawing Sheets

U.S. PATENT DOCUMENTS

2002/0036573 A1* 3/2002 Wyatt ............................ 340/945
2004/0172199 A1* 9/2004 Chavarria et al. ................ 702/14
2006/0036367 A1* 2/2006 Brewster ......................... 702/14

FOREIGN PATENT DOCUMENTS

| SU | 1484122 A3 | 6/1995 |
| WO | WO 2004/003594 A1 | 1/2004 |
| WO | WO 2005/088346 A1 | 9/2005 |

* cited by examiner

GRAVITY SURVEY DATA PROCESSING

CROSS-REFERENCE TO RELATED APPLICATIONS

This application is the U.S. National Phase of PCT/GB2006/050211, filed Jul. 17, 2006, which claims priority to United Kingdom Application 0515402.6, filed Jul. 27, 2005, and United Kingdom 0515401.8, filed Jul. 27, 2005, and U.S. Provisional Application 60/754,862, filed Dec. 29, 2005, the disclosures of which are hereby incorporated by reference in their entireties.

FIELD OF THE INVENTION

This invention relates to improved techniques for processing potential field measurement data from airborne surveys such as gravity surveys, and to improved techniques for data acquisition which are enabled by the improved data processing techniques.

BACKGROUND OF THE INVENTION

Conventionally airborne potential field surveys such as gravity surveys are flown on a grid pattern. The grid is defined by orthogonal sets of parallel lines (flight paths) on a two-dimensional surface which is draped over the underlying terrain. The draped surface satisfies a minimum height constraint (defined by the closest the aircraft is permitted to fly to the ground) and by a constraint on the maximum rate of climb/descent of the aircraft, typically around three percent. This approach suffices for flat terrain but for hilly or mountainous terrain the surface on which the aircraft flies can vary by as much as two or three kilometres from, say, the bottom of an underlying valley to the top of the mountains/survey area so another approach is needed.

It is useful to be able to collect potential field data, in particular gravity data, from close to the ground i.e. a low height. In a gravity survey nearby mass provides both high and low (spatial) frequency data, whereas the influence of a deeper mass is seen primarily at lower frequencies only. When looking for underlying anomalies the intervening mass has a dominating effect and to provide an accurate representation of deep features a good representation of surface features is desirable so as to be able to subtract-off particularly the higher frequencies (which dominate the power spectrum). For example, a signal with wavelength $\lambda$ falls off with height z as $\exp(-kz)$ where $k=2\pi/\lambda$ from which it can be estimated that a signal component of wavelength 200 metres from a mass at a depth of 100 metre has fallen to approximately $\frac{1}{20}$ of its initial value at the earth's surface (and is progressively further attenuated with increasing height), whereas it can be seen that longer wavelengths are much less attenuated. Generally the size and position of a survey is broadly chosen according to a wavelength scale corresponding to a signature expected given the target's size and depth.

It will be appreciated from the foregoing discussion that it is generally desirable to be able to perform a flight survey at a low height, but in practice the aircraft's limitations and gridded flight plan can impose significant restrictions. The gridded flight plan is necessary because conventional techniques for processing gravity survey data rely on a constant height assumption. Broadly, the assumption is that for a deep source the aircraft's height is approximately constant, the error from this assumption supposedly being only a small correction. Furthermore conventional gravity survey data processing techniques rely on regularly spaced data points, normally a power of two, so that a (fast) Fourier transform can be applied, this defining the requirement for orthogonal sets of parallel flight paths. The flight paths are required to be in a common surface since existing techniques assume, for example, that where two paths cross they cross at the same height. A further problem with existing flight paths arises when the surveyed area is not precisely rectangular, for example because of the local terrain. In this case in order to be able to apply the conventional techniques the data points are "padded", for example by interpolation or extrapolation to generate a regular set of data points over a rectangular area. The wavelengths (or more particularly, wavenumbers) used for the Fourier analysis are then determined by the maximum x and y (length and breadth) dimensions of the now padded rectangular area.

In view of the above drawbacks of conventional techniques, improved potential field survey data processing techniques and survey flight patterns are desirable.

SUMMARY OF THE INVENTION

According to a first aspect of the present invention there is therefore provided a method of processing measured potential field data from a potential field survey of the earth to determine map data for mapping said field, the method comprising: inputting said measured potential field data, said measured potential field data comprising data defining a plurality of potential field measurements and associated positions, each said position defining a position of a said potential field measurement in three dimensions; determining a plurality relationships between said potential field measurements and said positions, each said relationship relating a said potential field measurement to a function of a said associated position in three dimensions multiplied by a field mapping parameter; and determining a substantially self-consistent set of said field mapping parameters for said plurality of relationships to thereby determine said map data.

The potential field data may comprise gravimeter data (measuring gravity field), gravity gradiometer data (measuring magnetic field gradient), vector magnetometer data, true magnetic gradiometer data, or other similar data. The field mapping parameters (coefficients or parameters which allow the characterisation of the potential field) may be used to generate similar potential field data and in embodiments, broadly speaking, the parameters are determined by selecting parameter values which define potential field data such as a gravity field or gravity gradient field which most closely approximates the measured potential field data. This may comprise, for example, minimising a mean squared error or another similar optimisation.

In embodiments the relationships comprise a set of simultaneous equations which may be represented, for example, by a matrix, and the determining comprises solving these equations. Preferably the equations are over-constrained and the solving comprises solving by a noise-reducing procedure such as a least squares optimisation. Preferably the relationships are such that they have the form of a real (gravity) potential field so that noise, which will not generally have this form, is in effect discarded by the optimisation procedure. Thus, preferably, the (three-dimensional) position function satisfies Laplace's Equation. In some representative examples of the method there may be of order 10K parameters and 100K positions.

The map data may simply comprise the set of field mapping parameters (the potential field coefficients or parameters) since this data may be used to generate a range of potential field data (for example gravity field or gravity gradient field data) depending upon the desired height, region of coverage and/or surface to be mapped. However the method may further comprise determining the relevant field, typically on a surface, from the set of field mapping parameters to generate a map, that is performing a forward calculation of potential field data from the set of field map parameters. As will be mentioned again later, embodiments of the method generate the same type of potential field data as that measured, at least implicitly in determining the field mapping parameters through a procedure which aims to minimize or otherwise optimise differences between calculated and measured values. That this is valid whether potential field data comprises, say, gravimeter data or gravity gradiometer data, can be seen by application of one of Green's Theorems. Furthermore knowledge of one type of potential field data such as a gravity field or gravity gradient field, allows the other to be determined by integration/differentiation, as well as the scalar potential.

In one embodiment of the method an equivalent source representation of the potential field data is employed. In this embodiment a surface density or (mass) values for a plurality of surface mass elements are found which together produce a gravity (or other) field which best approximates the measured gravity (or other) field. The surface is generally, but need not be planar and, for example, may be chosen to approximate the surface of the earth in the surveyed region. Once values for these mass elements has been found a simple forward calculation can be employed to predict the scalar potential or gravity field or gravity gradient field, for example to generate any desired map of the surveyed region. Typically a forward calculation is made to determine one or more components of the field over a flat mapping plane.

In outline, in embodiments of this method the square of the difference between the measured field and that determined from the equivalent source masses (whether gravity or gravity gradient is measured/calculated) is a function of the mass errors. Thus by partial differentiation of this function with respect to, separately, the mass of each surface element a set of simultaneous equations is formed in which the only variables are the masses of each surface mass element (providing the measurement position with respect to the surface mass element, r-r', is known). Conveniently this set of simultaneous equations can be represented by a matrix, and solved for values of the surface mass elements. Since the number of measurements is generally much greater than the number of simultaneous equations (i.e., the number of mass elements), for example at least five or ten times greater, the set of equations is over-constrained. This is useful because if this were not the case the values of the surface mass elements would fit to the noise; instead an optimisation procedure, for example a least squares fit, is used to determine the values of a surface mass elements, thus reducing the noise. Or moreover because a physical model gravitational field is used the equations obey Laplace's Equation so that it is the gravitational field rather than the noise which tends to be fitted.

In a second embodiment of the method a modified Fourier basis functions technique is employed. In this method a two-dimensional Fourier expansion is used to represent the measured data but with a height-dependent coefficient ($e^{-|k_{mn}|z}$) multiplying each two-dimensional component ($e^{-|k_{mn}|z}$) this representation is still completely general and obeys Laplace's Equation (when differentiated the multipliers of the height-dependent coefficient and of the 2D components cancel). The expansion can be truncated at a point dependent upon the desired accuracy of the representation, for example determined by the number of dependents made. Other expansions can be employed, for example spherical harmonics, which are useful for larger areas, in particular where the curvature of the earth becomes significant.

Broadly speaking coefficients for the expansion are determined in the following way. At position r the measured potential field (gravity or gravity gradient) is known and, for a particular pair of values $k_m$ and $k_n$, the value of $e^{ik_m x}e^{ik_n y}e^{-|k_{mn}|z}$ is also known. Thus in the Fourier expansion (for example, refer to Equation (3) later) every data point can, in effect, be treated separately and, as with the first embodiment described above, a set of simultaneous equations is generated which can be solved for the Fourier expansion coefficients. These coefficients can then be employed to determine (by forward calculation) the gravity or gravity gradient on any two-dimensional surface, that is to provide a map. It will be recognised that with this (and the preceding) embodiment the data can be randomly sampled since the data points are effectively disconnected—all that is needed is a set of measurements and associated (x, y, z) positions in order to be able to determine the gravity or gravity gradient field on any other set of points, in particular on a surface or plane, that is a map. Furthermore it can be seen from this that, by conventional methods, there is no need for padding of measured data to build up a rectangle. Conceptually the data points can be treated as an arbitrarily shaped portion of a two-dimensional region of maximum dimensions determined by maximum wavelengths for the Fourier expansion in the x and y directions (although, as can be seen, there is no need for the measured data to lie on a two-dimensional surface). It can be seen, therefore, that values for $k_m$ and $k_n$ can be chosen independent of the survey dimensions (here k being wavenumber, that is $2\pi/\lambda$ whereas with a conventional survey the maximum wavelength must correspond to either the length or breadth of the rectangular surveyed area).

In another aspect the invention provides a data processing system for processing measured potential field data from a potential field survey of the earth to determine map data for mapping said field, the system comprising: data memory for storing said measured potential field data, said measured potential field data comprising data defining a plurality of potential field measurements and associated positions, each said position defining a position of a said potential field measurement in three dimensions; program memory storing processor control code; and a processor coupled to said data memory and to said program memory, to load and implement said control code, said code comprising code for controlling the processor to: input said measured potential field data; determine a plurality relationships between said potential field measurements and said positions, each said relationship relating a said potential field measurement to a function of a said associated position in three dimensions multiplied by a field mapping parameter; and determine a substantially self-consistent set of said field mapping parameters for said plurality of relationships to thereby determine said map data.

In a further related aspect the invention provides a method of processing measurement data from an airborne gravity survey to provide data for a gravity map, the measurement data comprising a plurality of gravitational potential field measurements each with an associated measurement position in three dimensions, the method comprising using said measurement data to estimate coefficients multiplying a function of said three-dimensional position in a harmonic expansion to thereby determine a representation of a gravity field in an area of said survey for said gravity map.

The invention further provides a method of processing measurement data from an airborne gravity survey to provide data for a gravity map, the measurement data comprising a plurality of gravitational potential field measurements each with an associated measurement position in three dimensions, the method comprising using said measurement data to estimate a plurality of mass elements each multiplying a function of said three-dimensional position in an equivalent source representation of said gravity field to thereby provide said data for said gravity map.

The invention further provides a method of mapping a gravity field, the method comprising: inputting measurement data from an airborne gravity survey, the measurement data comprising a plurality of gravitational potential field measurements each with an associated measurement position in three dimensions; determining a plurality relationships between said potential field measurements and said positions, each said relationship relating a said potential field measurement to a function of a said associated position in three dimensions multiplied by a field mapping parameter; and mapping said gravity field by determining a substantially self-consistent set of said field mapping parameters for said plurality of relationships.

Embodiments of the above-described methods further comprise surveying the field to obtain the measured potential field data by flying a set of paths which are not constrained to be parallel or define a rectangular grid pattern.

As previously mentioned, embodiments of the above method may be employed, if desired, with effectively randomly sampled data. Whilst random sampling may not be practically convenient nevertheless it will be appreciated that because the methods we describe are generally unconstrained the flight survey paths may be chosen so as to obtain better initial data, in particular by flying as low as possible constrained only by general safety considerations and the aircraft's capabilities. Thus, for example, a broadly conventional set of paths may be supplemented by additionally flying along the lines of valleys and/or modified by, say, curving one or more flight paths to fit around a mountain.

Although there is no need for paths to cross at substantially the same height (a "crossover"), nevertheless crossovers are useful for reduction of noise and low-frequency drift because they provide two closely correlated measures of similar regions. However, unlike conventional surveys, there is no need for the paths to cross at the same height. Furthermore a variety of crossing patterns is also available, for example in a valley two piecewise linear or serpentine paths could zig-zag in opposite directions to provide a succession of crossovers along the paths.

According a further aspect of the invention there is therefore provided a method of flying an airborne potential field survey, the method comprising flying an aircraft along a set of paths and measuring potential field data at points on said paths, wherein said set of paths has one or more of the following features: two paths cross at heights differing by at least 50 metres; in a region of said survey paths in the same general direction are non-parallel by greater than 5 degrees; said paths include curved paths; said paths of said set of paths, taken together, do not substantially lie in a surface; said paths of said set of paths, taken together, define a surface wherein at least one of said paths defines one of two orthogonal directions in said surface such that said surface has a rate of change of height with distance in the other orthogonal direction of greater than 5 percent.

In embodiments of the above described methods the two paths cross at heights differing by more than 50, 100, 150 or 200 metres. The paths may be linear, piecewise linear or curved and, in general, adjacent flight paths may be non-parallel by more than two degrees, three degrees, five degrees, ten degrees or more. As previously mentioned the paths, taken together, need not substantially lie in a surface, in particular because there is no "substantially constant height" constraint. However one convenient method of constructing a set of paths for such an airborne survey is to build a conventional survey and then modify this so as to more closely approach the ground in particular regions, such as valleys where better coverage is desirable.

A typical method of constructing a conventional survey is to perform a two-dimensional drape of a surface on which the survey is to be performed over the underlying terrain. At high points of the underlying terrain the surface height is typically determined by a minimum permitted flying height for the aircraft (for safety), and then the surface height is reduced subject to aircraft-determined constraints on rate of climb/descent, typically of order two percent to three percent. Because the paths are constrained by a rectangular grid these constraints apply in two orthogonal directions. By contrast with embodiments of the above described method such a constraint need only be applied in one direction (one dimension rather than two). In effect a one-dimensional drape may be employed to determine the flight paths. Thus in embodiments of the method we describe the set of paths, taken together, defines a surface in which lies a said path defining one or two orthogonal directions, in the other direction the surface being permitted to have a rate of change of height with distance of greater than a permitted climb/descent rate of the aircraft, for example greater than three percent, five percent, ten percent, 20 percent or more.

The invention also provides a data carrier carrying aircraft navigational data for such a set of airborne potential field flight survey paths.

The invention further provides processor control code to implement the above-described methods, in particular on a data carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog (Trade Mark) or VHDL (Very high speed integrated circuit Hardware Description Language). As the skilled person will appreciate such code and/or data may be distributed between a plurality of coupled components in communication with one another.

Further aspects of the invention are as follows:

A method for conducting potential field surveys from the air whereby the aircraft is equipped with a range of geophysical measurement equipment including one or more potential field measurement instruments, for example vector gravimeter, gravity gradiometer, magnetometer, magnetic gradiometer or other and in which the aircraft flies an irregular set of disconnected, non level, non straight flight lines in a manner which covers the survey area, preferably with the lowest possible surface to plane separation for each line flown and with approximately uniform coverage over the survey area (such lines being consistent with safe operation of the aircraft). Preferably in this method the earth potential field quantity of interest is determined using algorithms which work with the measured potential field measurement instrument data, collected along the survey lines as it is without the need to either level the data, to bring data to a common horizontal plane or to grid the data, such data including the measurement of the potential field quantity itself and the (instantaneous) position and optionally attitude of the potential field measuring instrument(s).

A method of conducting potential fields surveys from the air as described above but with a flight pattern altered slightly with the goal of achieving an acceptable number of "crossovers" per unit area, here a "crossover" being a point where lines flown at different headings of the aircraft nominally cross at the same point in space.

A method for conducting potential field surveys from the air as described above where some lines from a set of essentially parallel but not necessarily straight lines, are deliberately made to meander so as to force a larger number of crossovers with other lines in that set which are flown parallel.

A method for conducting potential field surveys from the air as described above where all lines are flown with the goal of forcing a maximum (practicable) number of crossovers over the total survey area (given a constraint, say, on total path length/flying time). None of the survey lines will necessarily then be parallel to any other survey line, none of the lines will necessarily be straight and in general many of the lines will not traverse the whole survey from one side to the other.

A method for conducting potential field surveys from the air as described above but in which the aircraft flies a more conventional survey pattern, such as 2-D drape or constant height survey pattern or some other pattern which involves lines and tie lines which are flown with the intention that they intersect at every crossover. (For example the navigational data may define an exact intersection although in practice the pilot will generally only achieve this within a tolerance such as 10 m or 20 m).

A method for conducting potential field surveys from the air as described above in which the data is "levelled" before processing. Levelling here is a generic term which covers techniques, which include one or more of the following: noise reduction, removal of low frequency drift, matching low frequency content of neighbouring lines, referencing data to a fixed height plane and the like. The data may also be gridded before processing.

A method for conducting potential field surveys from the air as described above where the first stage of the analysis comprises the removal or adjustment of data which cannot realistically be caused by either geological structures under investigation or the geomorphology (the terrain) of the survey area. The effect of the terrain may also be used to correct the data at any stage of the processing before deduction of the gravity potential of the earth.

A method for conducting potential field surveys from the air as described above where an accurate DEM (digital elevation model) is produced using a combination of LIDAR (Laser radar) and an IMU (Inertial Measurement Unit) in conjunction with DGPS (Differential Global Positioning System) to correct the LIDAR data for the plane motion. The DEM and DGPS data may also be used to correct the measured potential field data for the terrain. Likewise aircraft acceleration, attitude, angular rate and angular acceleration data may also be used to correct the output data of the potential field instrumentation. Any onboard or remote sensor can be used to provide the position and motion information for the aircraft and/or the potential field instrumentation.

Preferably therefore the plane is fitted with any of a range of additional standard airborne geophysical survey instrumentation such as instrumentation for: GPS, DGPS, altimeter, altitude measurement, pressure measurement, hyperspectral scanner, an electromagnetic measurement (EM) system, a Time Domain Electromagnetic system (TDEM), a vector magnetometer, accelerometer, gravimeter, and other devices including other potential field measurement devices.

A method of conducting potential field surveys from the air as described above in which the outputs from instrumentation on the survey plane are corrected using instrumentation in a fixed or movable base station, for example according to best practice at the time. Such equipment may include GPS and magnetic instrumentation and high quality land gravimeters.

A method for conducting potential field surveys from the air as described above in which data collected according to any of the above methods is combined with any ground based or satellite based survey data to help improve the analysis, such data including terrain, spectral, magnetic or other data.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
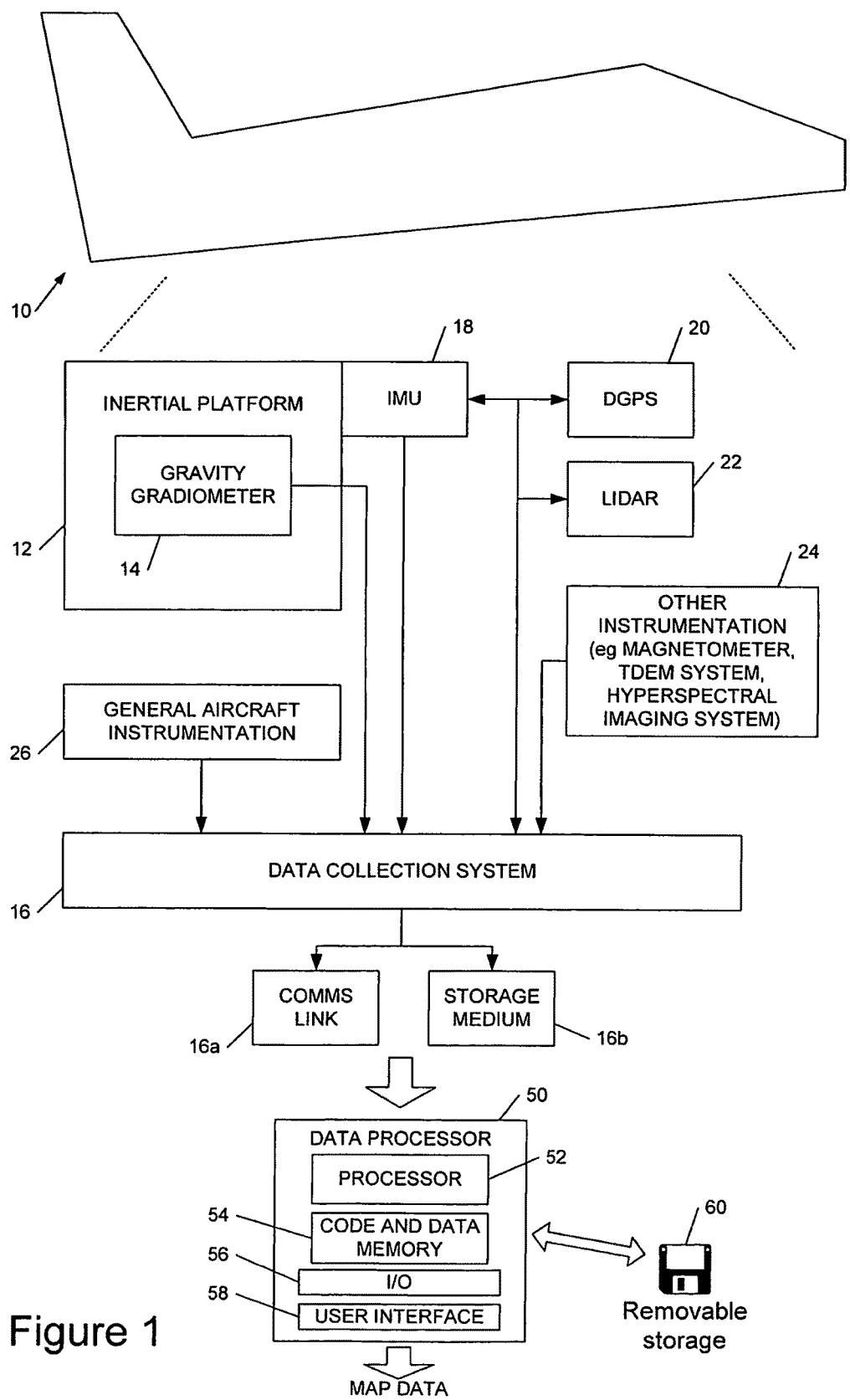
FIG. 1 shows an aircraft with flight survey data, and an example of a data processing system configured to implement an embodiment of a method according to the invention.

We first describe some background, helpful for understanding the invention.

Potential field data includes, but is not limited to, gravimeter data, gravity gradiometer data, vector magnetometer data and true magnetic gradiometer data. Such data is characterised mathematically by a series of relationships which govern how the quantities vary as a function of space and how different types of measurement are related. Elements and representations of a potential field may be derived from a scalar quantity.

For gravity, the relevant potential is the gravity scalar potential, $\Phi(r)$, defined as $$\Phi(r) = \int\int\int \frac{G\rho(r')}{|r-r'|} d^3 r'$$

Where r, $\rho(r')$, G are respectively, the position of measurement of the gravity field, the mass density at location r', and the gravitational constant. The gravitational force, which is how the gravitational field is experienced, is the spatial derivative of the scalar potential. Gravity is a vector in that it has directionality as is well known—gravity acts downwards. It is represented by three components with respect to any chosen Cartesian coordinate system as:

$$g = (g_x, g_y, g_z)$$
$$= \left(\frac{\partial \Phi(r)}{\partial x}, \frac{\partial \Phi(r)}{\partial y}, \frac{\partial \Phi(r)}{\partial z}\right)$$

Each of these three components varies in each of the three directions and the nine quantities so generated form the Gravity gradient tensor:

$$G = \begin{pmatrix} G_{xx} & G_{xy} & G_{xz} \\ G_{yx} & G_{yy} & g_{yz} \\ g_{zx} & G_{zy} & G_{zz} \end{pmatrix}$$

$$= \begin{pmatrix} \frac{\partial}{\partial x}\frac{\partial \Phi(r)}{\partial x} & \frac{\partial}{\partial x}\frac{\partial \Phi(r)}{\partial y} & \frac{\partial}{\partial x}\frac{\partial \Phi(r)}{\partial z} \\ \frac{\partial}{\partial y}\frac{\partial \Phi(r)}{\partial x} & \frac{\partial}{\partial y}\frac{\partial \Phi(r)}{\partial y} & \frac{\partial}{\partial y}\frac{\partial \Phi(r)}{\partial zx} \\ \frac{\partial}{\partial z}\frac{\partial \Phi(r)}{\partial x} & \frac{\partial}{\partial z}\frac{\partial \Phi(r)}{\partial y} & \frac{\partial}{\partial z}\frac{\partial \Phi(r)}{\partial z} \end{pmatrix}$$

The mathematical theory of potential fields and the fundamental equations and relationships follow from analysis of the properties of the scalar potential function, its derivatives, its Fourier transforms and other mathematical quantities.

From one of Green's theorems, in the event that any of the spatial derivatives of the scalar potential (including the scalar potential itself) are known over a closed surface, then the value of that spatial derivative is known at all points within the volume enclosed by that surface. A corollary to this is that once this quantity is known at all points, by differentiation and integration, all other derivatives of the scalar potential can be derived including the scalar potential itself. Thus the scalar potential and all of its derivatives are effectively known at all points within a volume when just one of its derivatives is known over a surface closing that volume. This indicates that a full measurement of any component of any of the derivatives of the scalar potential allows the calculation of any other component of any derivative of the scalar potential. Following from it also does not matter, at least in theory, which quantity is measured, the choice of instrumentation comes down simply to which instrument measures the desired quantity with the largest signal to noise.

Differentiation of the gravity scalar potential above (after some issues associated with 1/r where r→0) ultimately yields:

$$\nabla^2 \Phi(r) = \frac{\partial^2 \Phi(r)}{\partial x^2} + \frac{\partial^2 \Phi(r)}{\partial y^2} + \frac{\partial^2 \Phi(r)}{\partial z^2}$$
$$= -4\pi G \rho(r)$$

which, in regions where there is no matter reduces to Laplace's equation, an important fundamental relationship in gravity:

$$\nabla^2 \Phi(r) = \frac{\partial^2 \Phi(r)}{\partial x^2} + \frac{\partial^2 \Phi(r)}{\partial y^2} + \frac{\partial^2 \Phi(r)}{\partial z^2}$$
$$= 0$$

Harmonic functions satisfy Laplace's equation and they have many properties which may be utilised in the analysis of data collected from potential field surveys.

Data may be analysed and processed using a range of techniques which work with the data collected from the survey as a starting point but which thereafter alter both the data and/or its format so the values associated with the measured quantities all appear on a regular 2-D grid which is on a horizontal, fixed altitude analysis plane, the processes used being called "levelling" and "gridding".

Gridding is a geophysics numerical processing technique in which the basic idea is:
  to break the survey area up into rectangular cells whose sides are usually aligned to the principle directions flown for the survey,
  to replace the actual measurement data with data which is entirely "equivalent" to the measured data but which is now assigned values at points in the middle of each cell.

Such data is called "gridded" data. There are many ways to ensure that the data "invented" as being representative of the measured data is indeed "equivalent" to the measured data. There are also many ways to choose the dimension of each cell but they all relate to the average separation of lines flown in the two orthogonal directions. Where survey lines are not flown in a regular manner, as described herein, the concept of gridding, although not necessary, could still be used but there is much more scope for choice on the cell size and orientation.

Once the data is in this format, it is much more tractable mathematically. There is no requirement on any of the data involved in these processes to satisfy Laplace's equation. The data is treated as set of numbers and statistical and other methods are applied to the numbers to give the best estimate of the potential field on the horizontal analysis plane.

Data may be reduced to be a 2-D Fourier series so, in addition to the requirement that the data is at fixed altitude, there is the requirement that each line of data has $2^n$ data points in order to make the Fast Fourier transform method work, and that the data is collected in orthogonal directions.

The general form of the 2-D Fourier series representation for gravity gradient can be represented as a sum of 2-D spatial sine waves in the form:

$$g_{zz}(x, y) = \sum_m \sum_n g_{zz}(k_m, k_n) e^{ik_m x} e^{ik_n y}$$

where the wavenumbers $k_m$, $k_n$, are related to the size of the survey, $L_x$, $L_y$ in the x, y directions respectively by:

$$k_m = \frac{2\pi}{L_x},$$
$$k_n = \frac{2\pi}{L_y}$$

This expansion is only valid at constant height. However we will later describe the wavenumber and height dependence of the coefficients $g_{zz}(k_m, k_n)$, which collectively form the 2-D Fourier transform of the gravity gradient.

DETAILED DESCRIPTION OF PREFERRED EMBODIMENTS

Data does not have to be handled as above if one makes use of properties of the gravity or magnetic potential fields. The discussion below will be based upon gravity but can easily be extended to magnetic fields.

First we will state some observations relating to the gravity field:

1. The gravitational field outside a body can be modelled in all respects as if it came from matter situated entirely in a vanishingly thin layer at the surface of the body and which accurately follows the surface of the body. Such a layer defines an equivalent source—i.e. a source of gravity which produces substantially (theoretically exactly) the same gravity signature as does the body itself. There are many ways in which equivalent sources can be defined, they can be as above or they can be strictly horizontal, they can be all or partly above or below the surface of the earth or other but they all have the same property; namely, they generate the same gravitational field as is generated by the earth. For further information reference may be made to R. J. Blakely, "Potential Theory in Gravity and Magnetic Applications", Cambridge University Press, 1995.
2. The gravity field outside a body can also be uniquely written as a modified 2-D Fourier basis function series which is valid at all positions outside the body. This function is explicitly harmonic and is reproduced below. Its form is completely general and can represent any possible mass distribution within the body.

In preferred embodiments we measure $G_{zz}$ as a function of position, $r_{measure}$, using a gravity gradiometer and work with this without needing to generate the other elements of the gravity gradient tensor. This can be used to generate a representation of the underlying mass distribution. Here we describe two techniques which may be employed, an equivalent source technique and a modified Fourier basis functions technique. The above mentioned Green's theorem shows that the underlying mass distribution can be derived, in principle from $G_{zz}$, although in the techniques we describe Green's theorem is not used explicitly.

EQUIVALENT SOURCE METHOD

In this embodiment the surface of the survey area is broken up into small pieces, typically of order 50 m on a side—these are called platelets (later, mass elements). It is easy to forward calculate the gravity from each platelet, Blakely (ibid), the mass of which is adjusted until the best overall fit to the measured data is obtained. This mass determination is done via a standard least squares fitting procedure. The fit is obtained by matching the data at the true measurement position to the gravity field generated by the proposed equivalent source at the identical true measurement positions. This process is mathematically rigorous and does not introduce any artificial adjustments to the data in order that it conforms to a horizontal rectangular survey.

Once this fit is obtained, the fit is deemed to be the primary data set. All subsequent analysis to determine geological structure compares and minimises differences between the gravitational field that any given geological structure would generate with that generated by the equivalent source. One real advantage of the technique is that the best fit comes from a mass distribution, albeit a synthetic one, and therefore the best fit solution will automatically satisfy Laplace's equation. This is unlike the conventional method as described above, which produces a numerical best fit but which does not impose the added restriction that the data has to satisfy Laplace's equation, i.e. that it could come from a real mass distribution.

The equivalent source method does not have to use a surface conformal to the topography, it can use sources which cover any surface which can be at constant altitude, above or below the earth's true surface, can cut through the earth's true surface and so on. The choice of a surface following the topography is likely to produce less variation in mass of the individual platelets but the overall result is not, in principle, dramatically affected by any reasonable choice of surface.

Likewise, the platelets can be of any size or shape and they do not even need to be equal in size—indeed, it helps the efficiency of the analysis if their size and geometry is allowed to vary depending upon how fast the topography is varying in each region. The mathematical complexity of the process is determined purely by the number of platelets used and how many of these platelets are used in the analysis at each position on the survey. One advantage of this technique is that for some components of gravity or gravity gradient, it is possible to use just platelets in the region of the data point and this dramatically reduces the complexity of the analysis. It is clear that this analysis is one in the space domain.

Once the equivalent source is generated, it is then possible to predict any derivative of the gravity scalar potential on any surface by direct forward calculation. This process is helpful both from an analysis and from a visualisation perspective.

In more detail, given the masses of each surface element, a straightforward calculation is used to predict what value would be obtained for the measured quantity at every measurement point, be that quantity a component of the gravity vector or of the gravity gradient tensor. In general, this will be a summation of the form shown below. Here we use gg as notation for the measured quantity which, as noted above, is $G_{zz}$ in some preferred embodiments.

$$gg_{calculated}(r_{measure}) = \sum_{all-masses} m_{mass-element} F(r_{measure} - r_{mass-element}) \quad \text{Equ (1)}$$

In the above equation F is called a Greens function (Blakely, ibid, at page 185, incorporated by reference) and $r_{mass-element}$ defines the location of the mass element (for example the centre of gravity or some other defined point). The function F is standard and known to those skilled in the art (and may be deduced for may different mass element geometries). For example the Green's function F for a rectangular prism is defined in Blakely, ibid, at page 187, and is incorporated by reference; this has 8 terms each of which corresponds to a vertex of the prism.

The important thing about this relationship is that function "F" is known and it is the masses of each element which are not. The calculated value, in general, will not be the same as the measured value and in one approach one constructs the following sum $$S = \sum_{all-measurements} [(gg_{calculated}(r_{measure}) - gg_{measured}(r_{measured}))^2] \quad \text{Equ (2)}$$

The quantity S in effect defines the total square error S (noise and modelling errors), and by minimising this a best fit $gg_{calculated}$ can be found. This can be done by standard procedures, for example using Matlab®.

By extension to the above argument, for the quantity S the only unknowns are the actual masses of each mass element, and of course the measurement noise associated with the measurement at each point. The best fit, that is the best estimate of the values of these mass elements, is obtained by requiring S to be a minimum with respect to variations in the masses of each element. When the correct coefficients are obtained, the quantity S is merely the sum of the squared noise terms associated with each measurement and this is the minimum value which can be obtained by S. By differentiating S with respect to the mass of each mass element, that is, the first derivative of S with respect to $m_{mass-element}$ must be zero for every mass element. This ultimately reduces to the generation of a set of simultaneous equations in which the only variables are the masses of each surface mass element and where the number of equations equals the number of mass elements involved in the fitting procedure. Conveniently this set of simultaneous equations can be represented by a matrix, and solved for values of the surface mass elements. Since the number of measurements is generally much greater than the number of simultaneous equations (i.e., the number of mass elements), for example at least five or ten times greater, the set of equations is over-constrained. This is useful because if this were not the case the values of the surface mass elements would fit to the noise; instead an optimisation procedure, for example a least squares fit, is used to determine the values of a surface mass elements, thus reducing the noise. Moreover because a physical model gravitational field (real mass elements) is used the equations obey Laplace's Equation so that it is the gravitational field rather than the noise which tends to be fitted.

In practice mass elements at greater than a defined distance may effectively be neglected, for example by weighting mass elements according to distance and setting the weight at zero beyond a threshold distance. This threshold distance is typically a few kilometres, for example in the range 1 to 10 kilometres, although it depends to some extent upon the geography (for example the distance may need to be extended to encompass a large nearby mountain). The result of weighting mass elements to neglect those at greater than a threshold distance is that a matrix representing a difference between the calculated measured values becomes a sparse matrix. This is helpful because such a matrix may comprise, for example, 100K by 500K data points and the processing burden is significantly reduced if these are mostly zeros.

The skilled person will understand that the above-defined quantity S is merely one way of fitting the calculated to the measured data, and there are many other ways. Once a plane for the equivalent surface for the mass elements has been defined the free parameters are the masses of the mass elements (since the distance function is known); the skilled person will understand that there are many numerical techniques which may be employed to fit these free parameters including, for example, an iterative numerical search. One technique which has been found helpful in practice is to use a version of equation 2 in which the squared function is missing, employing a modulus instead.

Once the mass elements have been found a forward calculation (i.e. summing the effects of the mass elements) allows other scalar potential components to be derived and, by differentiation other components of G. The deduced values of G can be compared with a geological model (referred to as an "interpretation") to determine the underlying geological structure.

Modified Fourier Basis Functions Method

In a second embodiment of the method a modified Fourier basis functions technique is employed. In this method a two-dimensional Fourier expansion is used to represent the measured data but each two-dimensional coefficient $A_{mn}$ of each component ($A_{mn}e^{ik_m x}e^{ik_n y}$) of the 2-D Fourier transform of the gravity field is rewritten as a product of a position independent coefficient, ($C_{mn}$) multiplying a height-dependent coefficient ($e^{-|k_{mn}|z}$). That is, $A_{mn}=C_{mn}e^{-|k_{mn}|z}$. Explicitly, one can write the gravity field of any mass distribution in the form $$gg(x,y,z) = \sum_m \sum_n C_{mn} e^{ik_m x} e^{ik_n y} e^{-|k_{mn}|z},$$

$$|k_{mn}| = \sqrt{(k_m^2 + k_n^2)}$$

In the language of Fourier transforms, $A_{mn}$ is the 2-D Fourier transform of the gravity field. This representation is completely general and each component of the expansion representing the gravity field explicitly obeys Laplace's Equation (when differentiated the multipliers of the height-dependent coefficient and of the 2D components cancel). What is now made explicit is the height dependence of each Fourier coefficient and it is also clear that the representation of the gravity field afforded by knowledge of the $C_{mn}$ coefficients allows the complete determination of the gravity field at any point in space where there is no mass. The expansion implied by this modified Fourier series can be truncated at a point dependent upon the desired accuracy of the representation.

At position r the measured potential field (gravity or gravity gradient) is known and, for a particular pair of values $k_m$ and $k_n$, known as wavenumbers, the value of each of the modified Fourier series basis functions, $e^{ik_m x}e^{ik_n y}e^{-|k_{mn}|z}$, is also known. Each wavenumber describes the harmonic spatial variation of the Fourier basis function, for example, every coefficient with a given wavenumber $k_m=2\pi/\lambda_m$ will be periodic in space with a period $\lambda_m$. A further property of the Fourier method is that, for each of the independent directions, every wavenumber will be a integer multiple of a minimum wavenumber which corresponds to a wavelength broadly equivalent to the size of the survey Other expansions can be employed, for example spherical harmonics, which are useful for larger areas, in particular where the curvature of the earth becomes significant.

Broadly speaking, coefficients for the expansion are determined in a manner virtually identical to that described above for the equivalent source method. Once one has chosen the maximum wavelength of interest for each direction, and of the orientation and origin of the coordinate system for measurement, the value of the basis functions can be determined at every point in space. Once this is done, the same difference squared function, S, is calculated for the measured quantity and the best values for the coefficients $C_{mn}$ are determined by minimising such function with respect to variations in $C_{mn}$. Thus, as with the first embodiment described above, a set of simultaneous equations is generated which can be solved for the Fourier expansion coefficients. These coefficients can then be employed to determine (by forward calculation) the gravity or gravity gradient on any two-dimensional surface, that is to provide a map. It will be recognised that with this (and the preceding) embodiment the data can be randomly sampled since the data points are effectively disconnected—all that is needed is a set of measurements and associated (x, y, z) positions in order to be able to determine the gravity or gravity gradient field on any other set of points or indeed on a plane, that is a map. Furthermore it can be seen from this that there is no need for padding of measured data to build up a rectangle. Conceptually the data points can be treated as an arbitrarily shaped portion of a two-dimensional region of maximum dimensions determined by maximum wavelengths for the Fourier expansion in the x and y directions (although, as can be seen, there is no need for the measured data to lie on a two-dimensional surface). It can be seen, therefore, that values for $k_m$ and $k_n$ can be chosen independently of the survey dimensions (here k being wavenumber, that is $2\pi/\lambda$ whereas with a conventional survey the maximum wavelength must correspond to either the length or breadth of the rectangular surveyed area).

In more detail, the concept behind the Fourier series route is to solve the problem of Equation (1) in the Fourier domain rather than in the space domain. In what follows, we will presume that $g_{zz}$ is the measured quantity (also referred to above as $G_{zz}$).

The gravity field from any body or mass distribution can be written in the completely general form:

$$g_{zz}(x, y, z) = \sum_m \sum_n g'_{zz}(k_m, k_n) e^{ik_m x} e^{ik_n y} e^{-|k_{mn}|z} \quad \text{Equ (3)}$$

where $$|k_{mn}| = \sqrt{k_m^2 + k_n^2}$$

In Equation (3) the coefficients $g_{zz}'(k_m, k_n)$ are formally independent of height and wavenumber, they depend only upon the geology under investigation. Note the formal similarity of Equation (3) to the general form of the 2-D Fourier series representation given above. The expressions are identical, which we want, only if $$g_{zz}(k_m, k_n) = g_{zz}'(k_m, k_n) e^{-|k_{mn}|z}$$

What we see is the strong dependence upon height and of wavenumber of the standard Fourier transforms, that is, of the coefficients $g_{zz}(k_m, k_n)$. This is why it is not practicable to do a standard Fourier transform of data collected on a variable height survey. It also shows why practically one cannot "upward" continue data on a point by point basis; upward continuation only works if the precise frequency content of the quantity is known. It can also be seen that each component of the expansion of Equation (3) has a different height dependence.

However, the modified Fourier basis function method we describe does not attempt to perform a Fourier transformation per se—it is, as described above, not a mathematically sound approach.

The process here is that every data point is treated on a similar basis and that the quantity $e^{ik_m x} e^{ik_n y} e^{-|k_{mn}|z}$ can be assigned a value which is accurate once the measurement position is known. This is because we chose the k-values as described later, and r(x,y,z) is known. Essentially maximum and minimum values for $k_x$ and $k_y$ are selected, for example by notionally putting a rectangle around (or slightly inside) the survey area—that is which approximately represents the survey area—and the dimensions of the rectangle define the maximum wavelength (k-values). The minimum values may be chosen, for example, dependent upon the approximate average height of the survey, for example a multiple of the average survey height between 0.5 and 3. This is because the length scale of the variations depends on the survey height and, broadly speaking a minimum value is selected to represent variations which are expected or seen at the average survey height at greater than a threshold significance, taking into account computing power. To illustrate the concept, the exp(-kz) term above at z=survey height has attenuated by approximately $e^{-6}$ for wavelengths equal to the survey height.

We then have a set of equations based on Equation (3) equal to the number of data points used whereby the measured values of the gravity gradient, including noise, and the quantity $e^{ik_m x} e^{ik_n y} e^{-|k_{mn}|z}$ are known at every data measurement point. From that point, the only unknowns are the coefficients $g_{zz}'(k_m, k_n)$ and the fitting process clearly then becomes only one of obtaining the best estimates of the coefficients.

Referring back to Equation (3), this gives the calculated $g_{zz}$, and by analogy with Equation (1), a version of Equation (2) can be derived. This provides a set of equations equal to the number of unknowns, which in this case are values of the coefficients $g'_{zz}$.

This is done in the same way as for the equivalent source method, i.e. the coefficients are determined by a least squares fitting procedure. The important issue is that, in this form, the coefficients $g_{zz}'(k_m, k_n)$ explicitly have no height or wavenumber dependence.

This technique has a similar advantage to the equivalent source distribution in that the solution is harmonic because each term in the expansion of Equation (3) is explicitly harmonic. Instrument noise will not be harmonic so, this technique, even in isolation, has potential to remove much of the noise in the process.

This technique, like the equivalent source method, does not need regular gridded data, One additional surprising advantage of the technique is that it is not, like the Fourier series method itself, tied in the wavelengths which can be used for the analysis. This is a subtle result depending upon the validity of the modified Fourier Series method in completely general terms over whatever area might be of interest. The process involves choosing the maximum wavelengths of interest in the two orthogonal directions of the survey plane, which leads to a maximum wavelength of interest in each direction, $\lambda_{xmax}, \lambda_{ymax}$. This wavelength manifests itself as a minimum wavenumber in each direction given by $$k_{xmin} = \frac{2\pi}{\lambda_{xmax}},$$

$$k_{ymin} = \frac{2\pi}{\lambda_{ymax}}$$

All wavenumbers in the expansion of Equation (3) are integer multiples of these. That is:

$$k_m = m \cdot k_{xmin}, k_n = n \cdot k_{ymin}$$

It is further of advantage that this method does not have to have a power of 2 as the number of data points to be used in the analysis of each line, as is needed for the fast Fourier transform method. This avoids the need for data padding to achieve such a situation.

Unlike the equivalent source method, where the analysis is done in the space domain, Fourier series analysis is done in the frequency domain. By frequency is meant spatial frequency which is a measure of how many periods a given component has per unit measure of distance and this is represented by the wavenumbers introduced above—the larger the wavenumber, the larger the number of periods per unit of distance and the shorter the repeat distance. The proposed technique does not explicitly work in either domain, it merely generates a set of equations from which the best estimates of the unknowns can be calculated.

Fourier methods, in practical terms, usually require measurement over a rectangular area and the minimum wavenumbers are the longest wavelengths which can be used to represent the data—the longest wavelengths are explicitly the size of the survey in each direction. Where a survey does not conform to this criterion, data is usually created so that the revised data set does meet it in a process called padding.

The modified Fourier basis function method has many advantages compared to conventional Fourier analysis. For example:
1. It is not necessary to perform any Fourier transformations at all—we know what the standard format is going to be and the coefficients in the expansion of Equation (3) are to be determined via a best fit process rather than calculating the Fourier transforms explicitly.
2. The wavenumbers to be used do not have to be integer related to the size or shape of the survey. This is because we know the form of the Fourier transformation and we are determining the coefficients via a best fit process as just described.

Perhaps the most striking result is that the survey data can be collected at a non constant height. 2-D Fourier transforms as used conventionally, must be performed at a constant height and the Fourier transforms introduced in Equation (3) are strong functions of height. This functionality is explicitly expressed in Equation (3) and the coefficients $g_{zz}'(k_m,k_n)$ are no longer height dependent.

Review

Embodiments of the methods we describe allow the full use of the actual measured data and both are mathematically rigorous; they do not corrupt the data by making it fit to a regular constant height grid, the solutions generated are harmonic and the data does not have to have a power of two as the number of data points in two orthogonal directions.

In general the process is to use all data from every data point and try to generate an equivalent surface mass distribution or a set of modified Fourier series coefficients which best fit the data over the area of the survey.

This is fundamentally different to a processing method which assumes the data is from a fixed height, even if it is not, and generates new data from the measured data for the sole purpose of generating data on a regular 2-D grid. This "gridded" data set assigns values to the measured data which are not measured and are assigned to positions where the aeroplane did not collect data, although this is incorrect.

The errors generated by such a process are likely to be more serious if the fixed height approximation is poor in a given situation. They are also serious if one is trying to fly as close to the ground as possible to maximise the signal from small features relatively close to the surface of the earth—these features giving rise to short wavelength components in the modified Fourier series expansion. Finally, the errors are less serious when the instrument noise is large as the errors involved in the extrapolations are then smaller than those associated with the instrument.

Referring now to FIG. 1, this shows an example of an aircraft 10 for conducting a potential field survey to obtain data for processing in accordance with a method as described above. The aircraft 10 comprises an inertial platform 12 on which is mounted a gravity gradiometer 14 which provides potential field survey data to a data collection system 16. The inertial platform 14 is fitted with an inertial measurement unit (IMU) 18 which also provides data to data collection system 16 typically comprising attitude data (for example, pitch, roll and yaw data), angular rate and angular acceleration data, and aircraft acceleration data. The aircraft is also equipped with a differential GPS system 20 and a LIDAR system 22 or similar to provide data on the height of the aircraft above the underlying terrain. The aircraft 10 may also be equipped with other instrumentation 24 such as a magnetometer, TDEM system and/or hyperspectral imaging system, again feeding into the data collection system. The data collection system 16 also has an input from general aircraft instrumentation 26 which may comprise, for example, an altimeter, air and/or ground speed data and the like. The data collection system 16 may provide some initial data pre-processing, for example to correct the LIDAR data for aircraft motion and/or to combine data from the IMU 18 and DGPS 20. The data collection system 16 may be provided with a communications link 16a and/or non-volatile storage 16b to enable the collected potential field and position data to be stored for later processing. A network interface (not shown) may also be provided.

Data processing to generate map data for the potential field survey is generally (but not necessarily) carried out offline, sometimes in a different country to that where the survey data was collected. As illustrated a data processing system 50 comprises a processor 52 coupled to code and data memory 54, an input/output system 56 (for example comprising interfaces for a network and/or storage media and/or other communications), and to a user interface 58 for example comprising a keyboard and/or mouse. The code and/or data stored in memory 54 may be provided on a removable storage medium 60. In operation the data includes data collected from the potential field survey and the code comprises code to process this data to generate map data, for example in accordance with the procedure shown in FIG. 2, described below.

Figure 2:
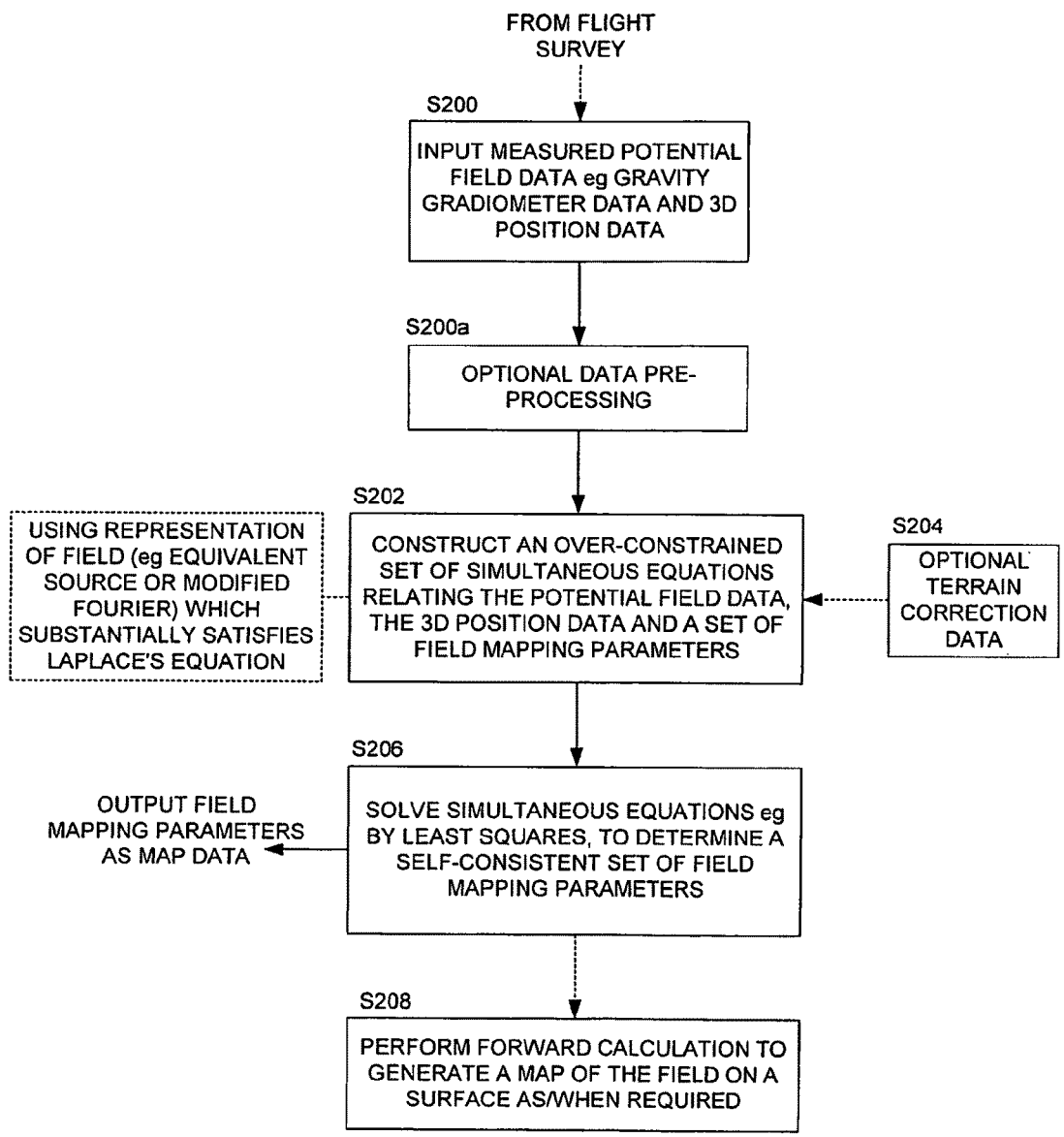
FIG. 2 shows a flow diagram of a procedure for processing measured potential field data to implement an embodiment of a method according to the invention.

Referring now to FIG. 2 this shows an example of a procedure for implementing on a data processor which may, in embodiments, comprise a general purpose computer system, for processing data from a flight survey in accordance with the previously described techniques. Thus, at step S200 the procedure inputs the measured potential field data, for example gravity gradiometer, and associated 3D position data. Optionally at step S200a, some pre-processing may be applied, for example to remove anomalies and/or to decrease (or increase) or select the data to be processed.

At step S202 the procedure constructs an over-constrained set of simultaneous equations relating the potential field data, the 3D position data and a set of field mapping parameters. More particularly the procedure constructs simultaneous equations which relate each potential field measurement to the function of an associated 3D position (s(r-r')) multiplied by a field mapping parameter. Preferably the procedure uses a representation of the potential field, more particularly a position function, which obeys Laplace's equation, for example an equivalent source or a modified Fourier basis function as described above. Optionally terrain correction data may be included at this stage (S204). The procedure solves these simultaneous equations (S206), for example by a conventional least squares method, to determine a substantially self-consistent set of field-mapping parameters. These effectively define a map of the potential field which was surveyed and therefore constitute one preferred output of the procedure. Then (S208) a forward calculation can be performed using these parameters to generate a desired map of the potential field on a surface, for example a surface approximating a region of the Earth, as and when required.

For conventional airborne gravity it was not necessary to fly very close to the earth because the instruments were relatively insensitive and additionally were set up to be sensitive only to long wavelengths. Surveys could be then be flown at more or less constant altitude or at a height where the data could be reasonably well assumed to be coming from a constant altitude.

However, for any survey using the new high sensitivity gravity gradiometer systems which are also capable of resolving much shorter wavelengths, it is desirable to fly as close to the ground as possible in order to maximise the signal, particularly that contained in the short wavelength components.

Such surveys are not likely to adequately satisfy the constant altitude criterion but all current analysis methods proceed as if they do.

It is, however, possible to utilise the equivalent source or modified Fourier transformation method to process the data and combine this with a flying method which is completely novel for potential field surveys.

In its most general form, the method is to fly a completely disconnected set of survey lines, collect the data from the lines and, using both the data and its absolute position of acquisition, obtain best fit parameters to either the equivalent source platelet masses or the components of the modified Fourier transform method.

The survey lines do not need to be straight, they do not need to be horizontal, they do not need to be flown in orthogonal directions, lines in approximately orthogonal directions do not need to intersect. Ideally the flight lines will follow the terrain as closely as possible without any other constraints. Of course, any other flying methodology which sits between this survey flying method and those involving constant altitude orthogonal intersecting flight lines is possible and any survey could involve elements of either flying method. It is the power and mathematical correctness of the analytical techniques which make these flying procedures possible.

Data collected using this flying method can clearly be additionally processed before or after the use of either the above processes. Any of the existing techniques for noise reduction or data combination can be utilised. Topographical effects can be largely eliminated by use of high quality DEMs, indeed any of the processes associated with more conventional data processing can be used.

The aeroplane can be any geophysical survey craft which is suited to low flying. In practice, the plane will be fitted with as much equipment as it can carry commensurate with safety and reasonable flying time. The equipment chosen will measure signals associated with the geology and signals associated with the plane motion. The latter signals are used, particularly in gravity related surveys, to correct the measurements taken by the instrumentation chosen to measure geological properties.

Figure 3:
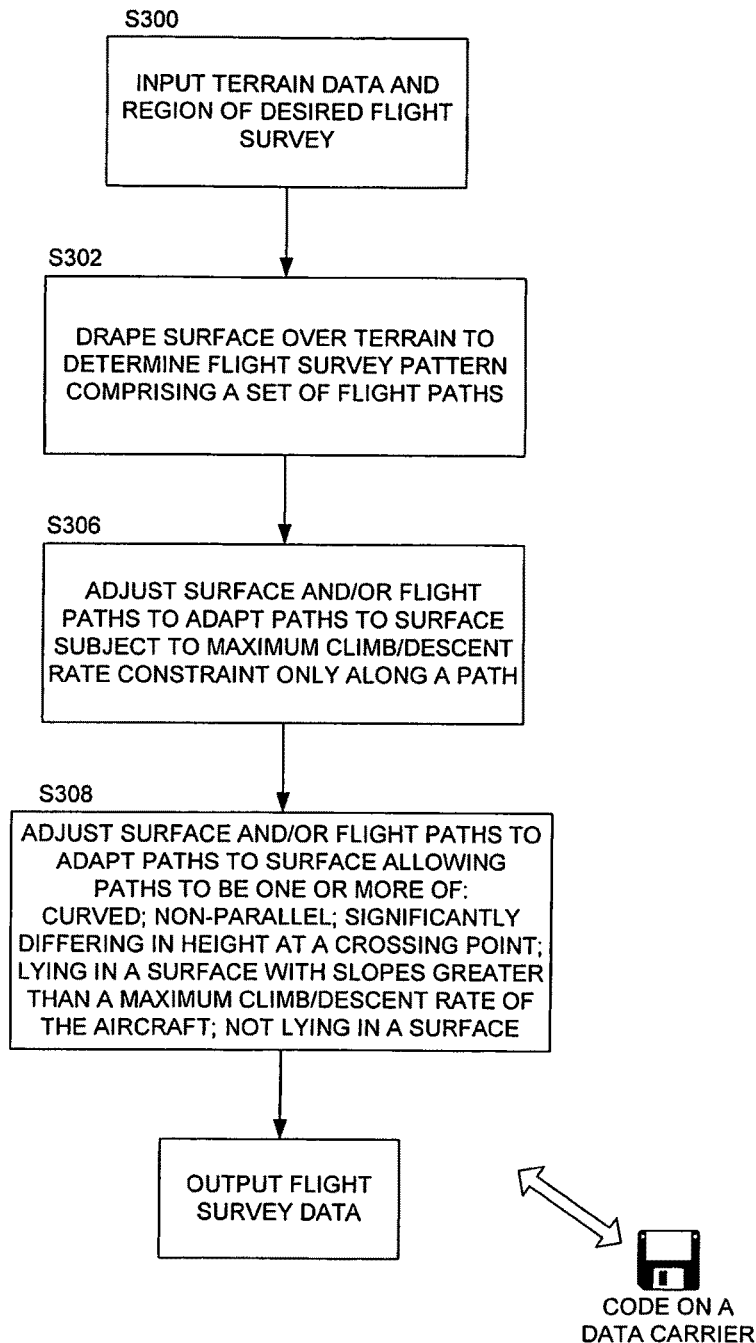
FIG. 3 shows a flow diagram of a procedure for generating flight path data for flying an airborne potential field survey according to an embodiment of a method of the present invention.

FIG. 3 shows a flow diagram of a procedure to generate flight survey data defining a flight pattern for a potential field survey, the results of which can be processed using the methods described above.

At step S300 the procedure inputs terrain data and, for example via a user interface, data defining a desired region to be surveyed. Then, at step S302, the procedure drapes a surface over the selected portion of terrain to determine a flight survey pattern comprising a set of flight paths. The draping of the surface may be subject to a constraint on a maximum slope in any direction within the surface and, initially, the flight paths may define a regular pattern. Then, however, at step S306 the procedure adjusts the surface and/or flight paths to adapt the paths to the surface. This is subject to a maximum climb/descent rate (determined from aircraft data) constraint but this only need be applied along a path. Thus in other directions, for example orthogonal to a path, the slope of the surface may exceed a value defined by this constraint. Additionally or alternatively at step S308 the procedure adjusts the surface and/or flight paths to adapt the paths more closely to the surface of the underlying terrain. This may be performed by allowing the paths to be one or more of: curved, non-parallel, significantly differing in height at a crossing point (for example more than 50 metres, 100 metres or 200 metres), lying in a surface with slopes greater than a maximum climb/descent rate of the aircraft, or not lying within a single surface. One this adaptation has been performed the procedure outputs flight survey data (S310) defining the determined set of flight paths. This data may then be used by a pilot to fly the aircraft in accordance with the determined survey pattern.

It will be appreciated that, unlike conventional gridded systems, such techniques enable flight paths to be defined along valleys, close to the valley floor where other techniques would limit the closest approach of the aircraft to the ground in such a situation because of a combination of the gridded pattern and the maximum climb/descent rate of the aircraft. It will likewise be appreciated that, in general, a set of terrain hugging paths may be defined because the techniques we describe enable data from such flight surveys to be processed. An advantage is that the data obtained from such techniques is much more accurate, because of the significant rate in decline of the amplitude of perturbations of a potential field with height above the surface of the Earth.

Figure 4:
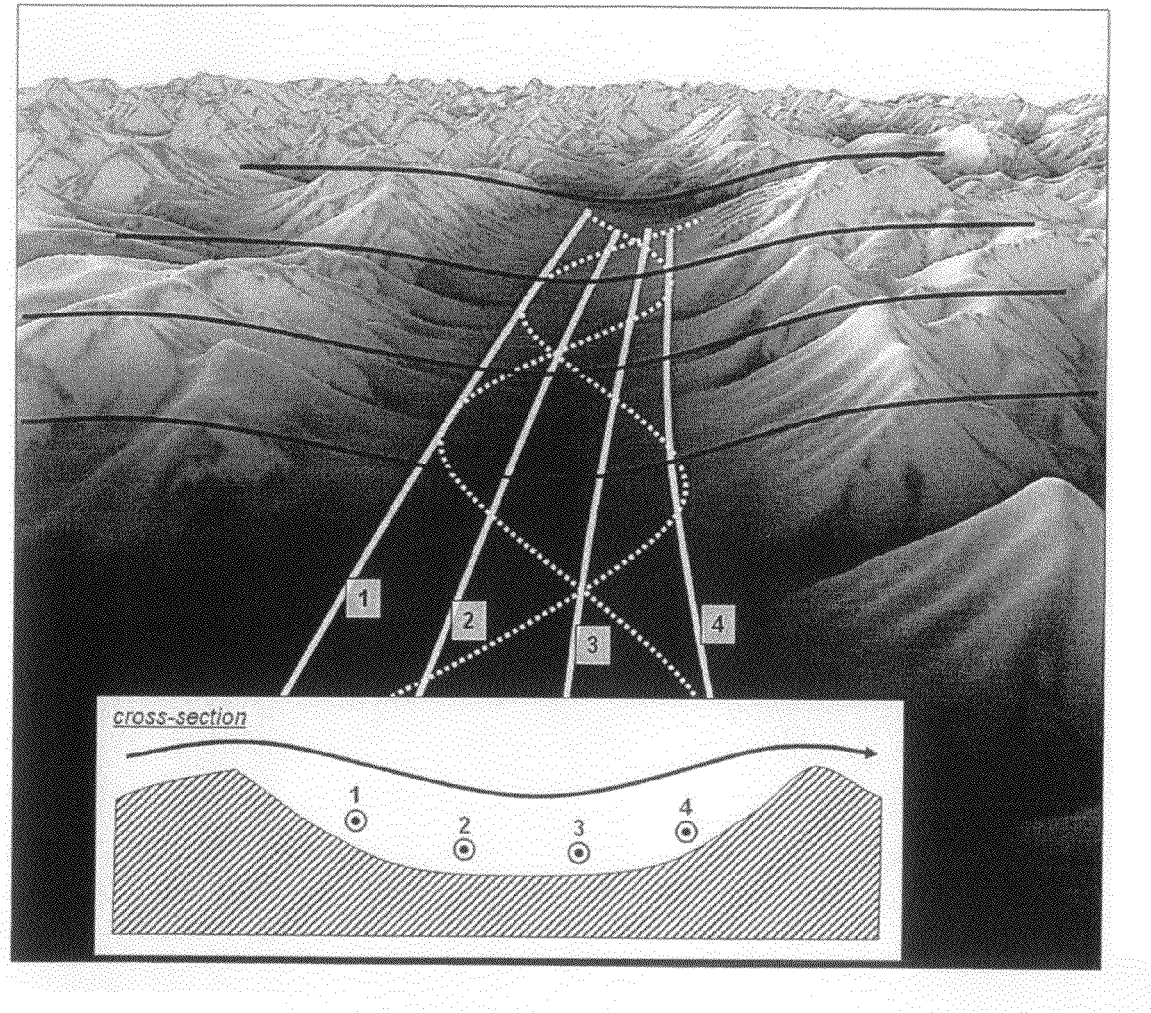
FIG. 4 shows an example set of flight paths for an airborne potential field survey, data from which may be processed according to embodiments of the invention.

FIG. 4 shows an example of a flight survey path, data from which can be processed by the techniques we have previously described. The figure shows examples of the types of paths which these techniques enable to be flown.

In flat areas, all flying strategies converge but it is in hilly or genuinely mountainous areas that the proposed method generates significant advantages. In such areas, each part of the survey area is analysed relatively independently and a strategy is developed as to how to fly the area.

In such situations, the area for survey is analysed for its topography and a flight survey strategy is developed based upon the geological targets of interest and how it is possible to fly the area to best identify those geological targets. If, as is usually the case, it is necessary to get very close to the ground at all points of the survey, then the survey lines will become disconnected with relatively little connectivity. The plane can only climb or descend at a given rate and adequate clearance is needed to get safely over ridges. Lines flown going "down" or "up" valleys will not intersect lines "crossing" the valleys or will intersect at many fewer crossovers. Crossovers are usually considered important to get rid of low frequency noise (often called drift) and this is another consideration on designing the survey.

Equipment desirable for a standard survey include: Gravity gradiometer; Gravimeter; Inertial measurement unit (IMU); GPS; LIDAR; Magnetic gradiometer; Magnetometer; Altimeter; Radar height meter; Barometer; Spectrometer; Hyperspectral imager; EM; TDEM; Navigation S/W; Data collection equipment.

Once the flight strategy is developed, the actual survey is flown and the data is collected. The analysis uses the real data from the potential field measurement system, this data is corrected for any known artefacts associated with the measurement (e.g. tilt of plane, accelerations of the plane, pressure affects and so on), and then the data is analysed as indicated above. The reason for flying low is because of the rapid height dependence of the measured signal, particularly those having short wavelengths, i.e. large wavenumber.

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A computer-implemented method of generating airborne flight survey data, the method comprising:
determining, by a processor, a flight survey pattern by draping a surface over the terrain underlying the survey in accordance with one or both of an aircraft maximum climb or maximum descent rate condition; and generating, by the processor, flight survey data for a plurality of paths substantially on said surface; and wherein the method further comprises adjusting one or both of said surface and one or more of said paths to reduce the height of one or more of said paths such that in at least one direction in said surface orthogonal to a said path at least one of said maximum climb and maximum descent rate condition is exceeded.

2. A method of flying an airborne flight survey comprising generating airborne flight survey data as claimed in claim 1 wherein said flight survey data defines a method of flying an airborne potential field survey, the method of flying an airborne flight survey comprising:

flying an aircraft along a set of paths and measuring potential field data at points on said paths, wherein said set of paths has one or more of the following features:

two paths cross at heights differing by at least 50 meters;

in a region of said survey paths in the same general direction are non-parallel by greater than 5 degrees;

said paths include curved paths;

said paths of said set of paths, taken together, do not substantially lie in a surface;

said paths of said set of paths, taken together, define a surface wherein at least one of said paths defines one of two orthogonal directions in said surface such that said surface has a rate of change of height with distance in the other orthogonal direction of greater than 5 percent.

3. A non-transitory computer readable medium having computer processor control code to implement the method of claim 1.

4. A non-transitory computer readable medium for storing the flight survey data of claim 1.

5. A method according to claim 1, wherein said measured potential field data comprises gravity gradiometer data, and wherein said field represents a gravity field.

6. A method according to claim 1, comprising altering said flight survey pattern to achieve an acceptable number of crossovers per unit area.

7. A method according to claim 1, wherein some lines from a set of essentially parallel lines are made to meander so as to force a larger number of crossovers with other lines in that set which are flown parallel.

* * * * *

UNITED STATES PATENT AND TRADEMARK OFFICE
CERTIFICATE OF CORRECTION

PATENT NO.       : 8,437,960 B2
APPLICATION NO.  : 11/989471
DATED            : May 7, 2013
INVENTOR(S)      : Barnes et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1359 days.

Signed and Sealed this
Eighth Day of September, 2015

Michelle K. Lee
*Director of the United States Patent and Trademark Office*